(12) United States Patent
Goller et al.

(10) Patent No.: US 10,611,659 B2
(45) Date of Patent: Apr. 7, 2020

(54) GLASS MANUFACTURING APPARATUS AND METHODS

(71) Applicant: CORNING INCORPORATED, Corning, NY (US)

(72) Inventors: Martin Herbert Goller, Campbell, NY (US); Aaron Joshua Hade, Corning, NY (US); Guido Peters, Bath, NY (US)

(73) Assignee: Corning Incorporated, Corning, NY (US)

( * ) Notice: Subject to any disclaimer, the term of this patent is extended or adjusted under 35 U.S.C. 154(b) by 130 days.

(21) Appl. No.: 15/553,022

(22) PCT Filed: Feb. 23, 2016

(86) PCT No.: PCT/US2016/019012
§ 371 (c)(1),
(2) Date: Aug. 23, 2017

(87) PCT Pub. No.: WO2016/137913
PCT Pub. Date: Sep. 1, 2016

(65) Prior Publication Data
US 2018/0050947 A1 Feb. 22, 2018

Related U.S. Application Data

(60) Provisional application No. 62/121,264, filed on Feb. 26, 2015.

(51) Int. Cl.
*C03B 17/06* (2006.01)
*C03B 7/02* (2006.01)

(52) U.S. Cl.
CPC .............. *C03B 17/064* (2013.01); *C03B 7/02* (2013.01)

(58) Field of Classification Search
CPC ................................ C03B 17/064; C03B 7/02
See application file for complete search history.

(56) References Cited

U.S. PATENT DOCUMENTS 4,780,122 A * 10/1988 Schwenninger .......... C03B 5/20
65/126
2002/0116952 A1 8/2002 Singer
(Continued)

FOREIGN PATENT DOCUMENTS

JP 03112818 A * 5/1991 ............... C03B 5/12
JP 10338528 A * 12/1998 ............. C03B 5/187
(Continued)

OTHER PUBLICATIONS

International Search Report and Written Opinion of the International Searching Authority; PCT/US2016/019012; dated Aug. 29, 2016; 11 Pages; Korean Intellectual Property Office.

*Primary Examiner* — Queenie S Dehghan
(74) *Attorney, Agent, or Firm* — Ryan T. Hardee (57) ABSTRACT

A glass manufacturing apparatus including a delivery vessel including a body portion with a cylindrical inner surface extending along a central axis of the body portion. In one embodiment, an upper end of the body portion is substantially equal to or lower than an uppermost portion of a travel path in a downstream end of a conduit connected to the delivery vessel. In another embodiment, a central axis of a delivery pipe is offset a distance from the central axis of the body portion of the delivery vessel. In still another embodiment, the delivery vessel includes a conical top including a taper angle from greater than 0° to about 20°. In further embodiments, methods include manufacturing glass with one or any combination of the above-referenced embodiments of glass manufacturing apparatus.

43 Claims, 5 Drawing Sheets

(56) References Cited

U.S. PATENT DOCUMENTS

| | | |
|---|---|---|
| 2003/0110804 A1 | 6/2003 | Fenn et al. |
| 2006/0242994 A1 | 11/2006 | Boratav et al. |
| 2008/0034798 A1 | 2/2008 | Bergman et al. |
| 2008/0282738 A1* | 11/2008 | Yoshida ............ B01F 7/004 65/178 |
| 2009/0038342 A1* | 2/2009 | Pitbladdo ............ C03B 5/187 65/27 |
| 2009/0282872 A1* | 11/2009 | Tomamoto ............ C03B 5/1875 65/66 |
| 2010/0126224 A1 | 5/2010 | Lineman et al. |
| 2010/0199720 A1* | 8/2010 | Roemer ............ C03B 5/182 65/134.1 |
| 2010/0269545 A1 | 10/2010 | Boratav et al. |
| 2012/0125051 A1 | 5/2012 | Bergman et al. |
| 2012/0216577 A1 | 8/2012 | Pitbladdo |

FOREIGN PATENT DOCUMENTS

| | | |
|---|---|---|
| JP | 2013216520 A | 10/2013 |
| WO | 2010141832 A1 | 12/2010 |

\* cited by examiner

GLASS MANUFACTURING APPARATUS AND METHODS

CROSS-REFERENCE TO RELATED APPLICATIONS

This application claims the benefit of priority under 35 U.S.C. § 371 of International Patent Application Serial No. PCT/US16/19012, filed on Feb. 23, 2016, which in turn, claims the benefit of priority of U.S. Provisional Patent Application Ser. No. 62/121,264 filed on Feb. 26, 2015, the contents of each of which are relied upon and incorporated herein by reference in their entireties.

BACKGROUND

It is known to provide glass manufacturing apparatus with a delivery vessel. When manufacturing glass, the delivery vessel may facilitate delivery of molten material from an upstream location of the glass manufacturing apparatus to a downstream location of the glass manufacturing apparatus.

SUMMARY

The following presents a simplified summary of the disclosure to provide a basic understanding of some exemplary aspects described in the detailed description.

The present disclosure relates generally to glass manufacturing apparatus and methods and, more particularly, to glass manufacturing apparatus including a delivery vessel and methods of manufacturing glass with a delivery vessel.

In accordance with a first embodiment, a glass manufacturing apparatus comprises a conduit including a downstream end connected to a delivery vessel. The conduit may be configured to deliver molten material along a travel path to the delivery vessel. The delivery vessel may further include a body portion including a cylindrical inner surface extending along a central axis of the body portion. An elevation of an upper end of the body portion can be substantially equal to or lower than an uppermost portion of the travel path in the downstream end of the conduit.

In one embodiment of the first embodiment, the glass manufacturing apparatus may further comprises a forming vessel including an inlet configured to receive the molten material from the delivery vessel. In one particular embodiment, the forming vessel may further include a trough configured to receive the molten material from the inlet, and a wedge. The forming vessel can be configured such that molten material may overflow from the trough and flow down converging surfaces of the wedge to be drawn off a root of the wedge as a glass ribbon.

In another embodiment of the first embodiment, the cylindrical inner surface may include a substantially constant diameter from the upper end of the body portion to a lower end of the body portion.

In still another embodiment of the first embodiment, the delivery vessel may further include a conical top attached to the upper end of the body portion, wherein the conical top can include a conical taper with a taper angle from greater than 0° to about 20°. In one particular embodiment, a stand pipe may be connected to the conical top. The stand pipe can be configured to equalize a pressure within the delivery vessel.

In yet another embodiment of the first embodiment, the glass manufacturing apparatus may further comprises a stand pipe attached to the conduit. The standpipe can be configured to equalize a pressure within the delivery vessel.

In a further embodiment of the first embodiment, the glass manufacturing apparatus may further comprise a delivery pipe configured to receive molten material from the delivery vessel. The delivery pipe can include a cylindrical inner surface extending along a central axis of the delivery pipe. The central axis of the delivery pipe may be offset a distance from the central axis of the body portion of the delivery vessel. In one particular embodiment, the offset distance of the central axis of the delivery pipe from the central axis of the body portion of the delivery vessel can be in a range from greater than 0% to about 50% of a diameter of the body portion of the delivery vessel. In another particular embodiment, the central axis of the delivery pipe can be offset from the central axis of the body portion of the delivery vessel in a direction away from the downstream end of the conduit. In still another particular embodiment, the central axis of the delivery pipe can be substantially parallel to the central axis of the body portion of the delivery vessel.

In still a further embodiment of the first embodiment, a method of manufacturing glass with the glass manufacturing apparatus of the first embodiment may include the step of passing molten material along the travel path through the downstream end of the conduit to an interior of the body portion of the delivery vessel. The uppermost portion of the molten material within the body portion can be at an elevation that is substantially equal to or lower than an uppermost portion of the molten material in the downstream end of the conduit. In one particular embodiment, the method may further comprise the steps of passing the molten material through the interior of the body portion, and passing the molten material from the delivery vessel to a forming vessel. In a further particular embodiment, the method may further include the step of drawing the molten material from the forming vessel into a glass ribbon. In another embodiment, the method can include the step of passing the molten material from the delivery vessel to a delivery pipe including a cylindrical inner surface extending along a central axis of the delivery pipe. The central axis of the delivery pipe can be offset a distance from the central axis of the body portion of the delivery vessel. In another particular embodiment, the method may further comprise the step of flowing molten material into an area defined by a conical top attached to the upper end of the body portion, wherein the conical top includes a conical taper with a taper angle from greater than 0° to about 20°.

Of course, the first embodiment can be provided alone or in combination with one or any combination of the embodiments of the first embodiment discussed above.

In accordance with a second embodiment, a glass manufacturing apparatus may comprise a delivery vessel including a body portion including a cylindrical inner surface extending along a central axis of the body portion. The glass manufacturing apparatus may further include a delivery pipe configured to receive molten material from the delivery vessel. The delivery pipe can include a cylindrical inner surface extending along a central axis of the delivery pipe. The central axis of the delivery pipe can be offset a distance from the central axis of the body portion of the delivery vessel.

In one embodiment of the second embodiment, the glass manufacturing apparatus may further comprise a forming vessel including an inlet configured to receive the molten material from the delivery pipe. In one particular embodiment, the forming vessel may further include a trough configured to receive the molten material from the inlet, and a wedge. The forming vessel can be configured such that molten material may overflow from the trough and flow down converging surfaces of the wedge to be drawn off a root of the wedge as a glass ribbon.

In another embodiment of the second embodiment, the cylindrical inner surface of the body portion of the delivery vessel can include a substantially constant diameter from an upper end of the body portion to a lower end of the body portion.

In still another embodiment of the second embodiment, the delivery vessel may further include a conical top attached to an upper end of the body portion, wherein the conical top includes a conical taper with a taper angle from greater than 0° to about 20°. In one particular embodiment, the glass manufacturing apparatus may further comprise a stand pipe connected to the conical top. The stand pipe can be configured to equalize a pressure within the delivery vessel.

In yet another embodiment of the second embodiment, the glass manufacturing apparatus further comprises a conduit including a downstream end connected to the delivery vessel, and a stand pipe attached to the conduit. The standpipe can be configured to equalize a pressure within the delivery vessel.

In still another embodiment of the second embodiment, the offset distance of the central axis of the delivery pipe from the central axis of the body portion of the delivery vessel can be in a range from greater than 0% to about 50% of a diameter of the body portion of the delivery vessel.

In yet another embodiment of the second embodiment, the glass manufacturing apparatus may further comprise a conduit including a downstream end connected to the delivery vessel. The central axis of the delivery pipe can be offset from the central axis of the body portion of the delivery vessel in a direction away from the downstream end of the conduit.

In another embodiment of the second embodiment, the central axis of the delivery pipe can be substantially parallel to the central axis of the body portion of the delivery vessel.

In a further embodiment of the second embodiment, a method of manufacturing glass with the glass manufacturing apparatus of the second embodiment can include the steps of passing molten material to the delivery vessel, passing the molten material through an interior of the body portion in a direction along the central axis of the body portion of the delivery vessel, passing the molten material from the delivery vessel to the delivery pipe, and passing the molten material through the delivery pipe in a direction of the central axis of the delivery pipe. In one particular embodiment, the method may further comprise the step of passing the molten material from the delivery pipe to a forming vessel. In another particular embodiment, the method can further include the step of drawing the molten material from the forming vessel into a glass ribbon. In another particular embodiment, the method can further include the step of flowing molten material into an area defined by a conical top attached to an upper end of the body portion. The conical top includes a conical taper with a taper angle from greater than 0° to about 20°.

Of course, the second embodiment can be provided alone or in combination with one or any combination of the embodiments of the second embodiment discussed above.

In accordance with a third embodiment, a glass manufacturing apparatus may comprise a delivery vessel including a body portion including a cylindrical inner surface extending along a central axis of the body portion. The delivery vessel can include a conical top attached to an upper end of the body portion. The conical top can further include a conical taper with a taper angle from greater than 0° to about 20°.

In one embodiment of the third embodiment, the glass manufacturing apparatus may further comprise a stand pipe connected to the conical top. The stand pipe can be configured to equalize a pressure within the delivery vessel.

In another embodiment of the third embodiment, the glass manufacturing apparatus may further comprise a forming vessel including an inlet configured to receive the molten material from the delivery vessel.

In still another embodiment of the third embodiment, the forming vessel may further include a trough configured to receive the molten material from the inlet, and a wedge. The forming vessel can be configured such that molten material may overflow from the trough and flow down converging surfaces of the wedge to be drawn off a root of the wedge as a glass ribbon.

In another embodiment of the third embodiment, cylindrical inner surface can include a substantially constant diameter from the upper end of the body portion to a lower end of the body portion.

In still another embodiment of the third embodiment, the method may comprise the step of flowing molten material into an area defined by the conical top.

Of course, the third embodiment can be provided alone or in combination with one or any combination of the embodiments of the third embodiment discussed above.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description serve to explain the principles and operations thereof.

BRIEF DESCRIPTION OF THE DRAWINGS

These and other features, aspects and advantages of the present disclosure can be further understood when read with reference to the accompanying drawings.

DETAILED DESCRIPTION

Apparatus and methods will now be described more fully hereinafter with reference to the accompanying drawings in which embodiments of the disclosure are shown. Whenever possible, the same reference numerals are used throughout the drawings to refer to the same or like parts. However, this disclosure may be embodied in many different forms and should not be construed as limited to the embodiments set forth herein.

Various glass manufacturing apparatus and methods of the disclosure may be used to produce glass articles (e.g., containers, ribbons etc.). In one particular example, glass manufacturing apparatus and methods may be used to produce glass articles comprising a glass ribbon that may be further processed into one or more glass sheets. For instance, the glass manufacturing apparatus may be configured to form a glass ribbon by a down-draw, up-draw, float, fusion, press rolling, slot draw, or other glass forming techniques.

The glass ribbon from any of these processes may be subsequently divided to provide sheet glass suitable for further processing into a desired display application. The glass sheets can be used in a wide range of display applications, for embodiment liquid crystal displays (LCDs), electrophoretic displays (EPD), organic light emitting diode displays (OLEDs), plasma display panels (PDPs), or the like. Frequently, glass sheets may need to be transported from one location to another.

Figure 1:
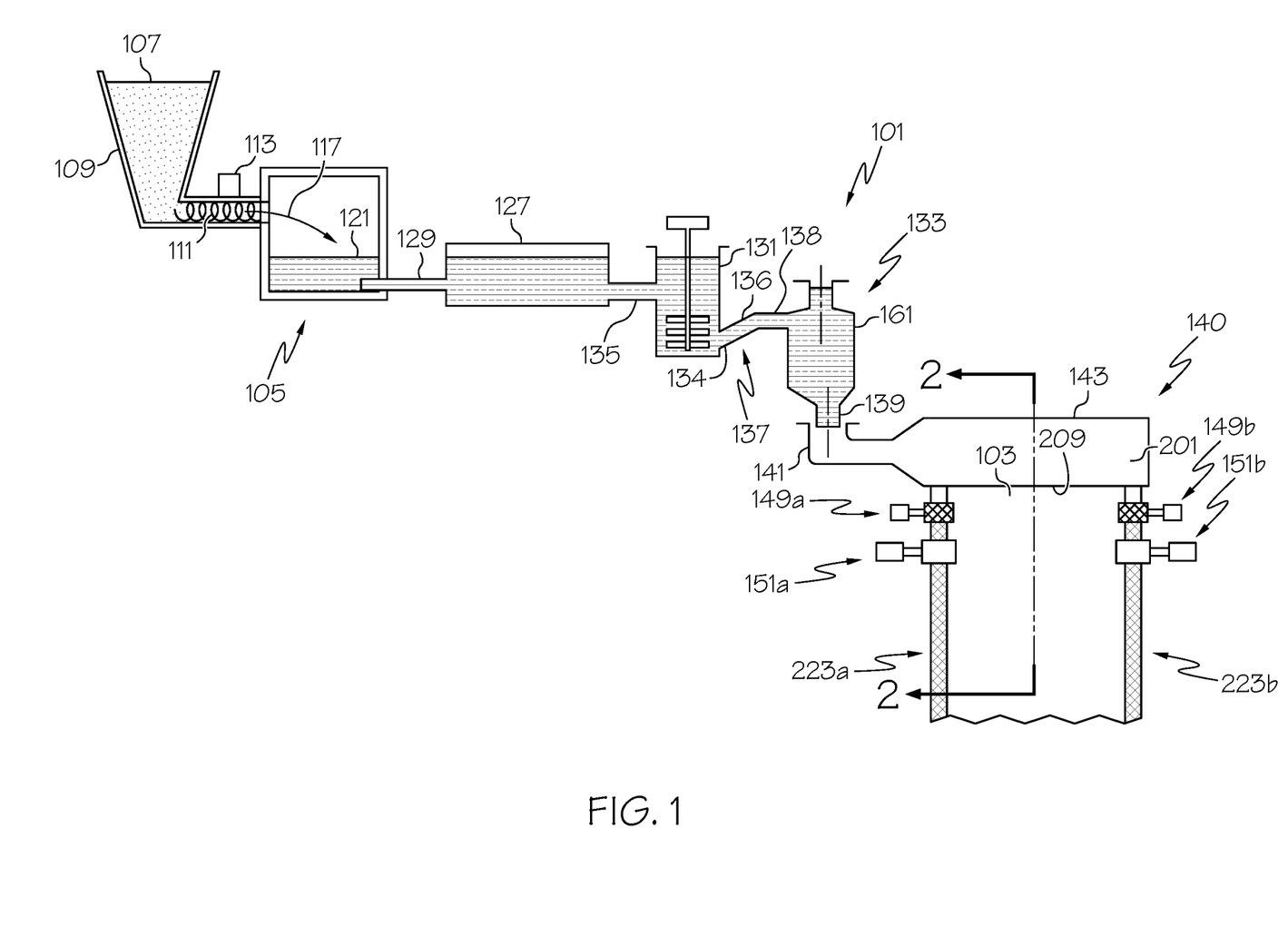
FIG. 1 schematically illustrates a glass manufacturing apparatus including a first embodiment of a delivery vessel.

FIG. 1 schematically illustrates an example glass manufacturing apparatus 101 configured to draw a glass ribbon 103. For illustration purposes, the glass manufacturing apparatus 101 is illustrated as a fusion down-draw apparatus although other glass manufacturing apparatus configured for up-draw, float, press rolling, slot draw, etc. may be provided in further examples. Moreover, as mentioned above, embodiments of the disclosure are not limited to producing glass ribbon. Indeed, the concepts presented in the present disclosure may be used in a wide range of glass manufacturing apparatus to produce a wide range of glass articles.

As illustrated, the glass manufacturing apparatus 101 can include a melting vessel 105 configured to receive batch material 107 from a storage bin 109. The batch material 107 can be introduced by a batch delivery device 111 powered by a motor 113. The motor 113 can introduce a desired amount of batch material 107 into the melting vessel 105, as indicated by arrow 117. The melting vessel 105 may then melt the batch material 107 into a quantity of molten material 121.

The glass manufacturing apparatus 101 can also include a fining vessel 127, for example a fining tube, located downstream from the melting vessel 105 and coupled to the melting vessel 105 by way of a first connecting tube 129. A mixing vessel 131, for example a stir chamber, can also be located downstream from the fining vessel 127 and a delivery vessel 133 may be located downstream from the mixing vessel 131. As shown, a second connecting tube 135 can couple the fining vessel 127 to the mixing vessel 131 and a third connecting tube 137 can couple the mixing vessel 131 to the delivery vessel 133. As further illustrated, an optional delivery pipe 139 can be positioned to deliver molten material 121 from the delivery vessel 133 to a fusion draw machine 140. As discussed more fully below, the fusion draw machine 140 may be configured to draw the molten material 121 into the glass ribbon 103. In the illustrated embodiment, the fusion draw machine 140 can include a forming vessel 143 provided with an inlet 141 configured to receive molten material from the delivery vessel 133 either directly or indirectly, for example by the delivery pipe 139. If provided, the delivery pipe 139 can be configured to receive molten material from the delivery vessel 133 and the inlet 141 of the forming vessel 143 can be configured to receive molten material from the delivery pipe 139.

As shown, the melting vessel 105, fining vessel 127, mixing vessel 131, delivery vessel 133, and forming vessel 143 are examples of molten material stations that may be located in series along the glass manufacturing apparatus 101.

The melting vessel 105 and features of the forming vessel 143 are typically made from a refractory material, for example refractory ceramic (e.g. ceramic brick, ceramic monolithic forming body, etc.). The glass manufacturing apparatus 101 may further include components that are typically made from platinum or platinum-containing metals for example platinum-rhodium, platinum-iridium and combinations thereof, but which may also comprise such refractory metals as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the mixing vessel 131 (e.g., a stir chamber), the third connecting tube 137, the delivery vessel 133, the delivery pipe 139, the inlet 141 and features of the forming vessel 143.

Figure 2:
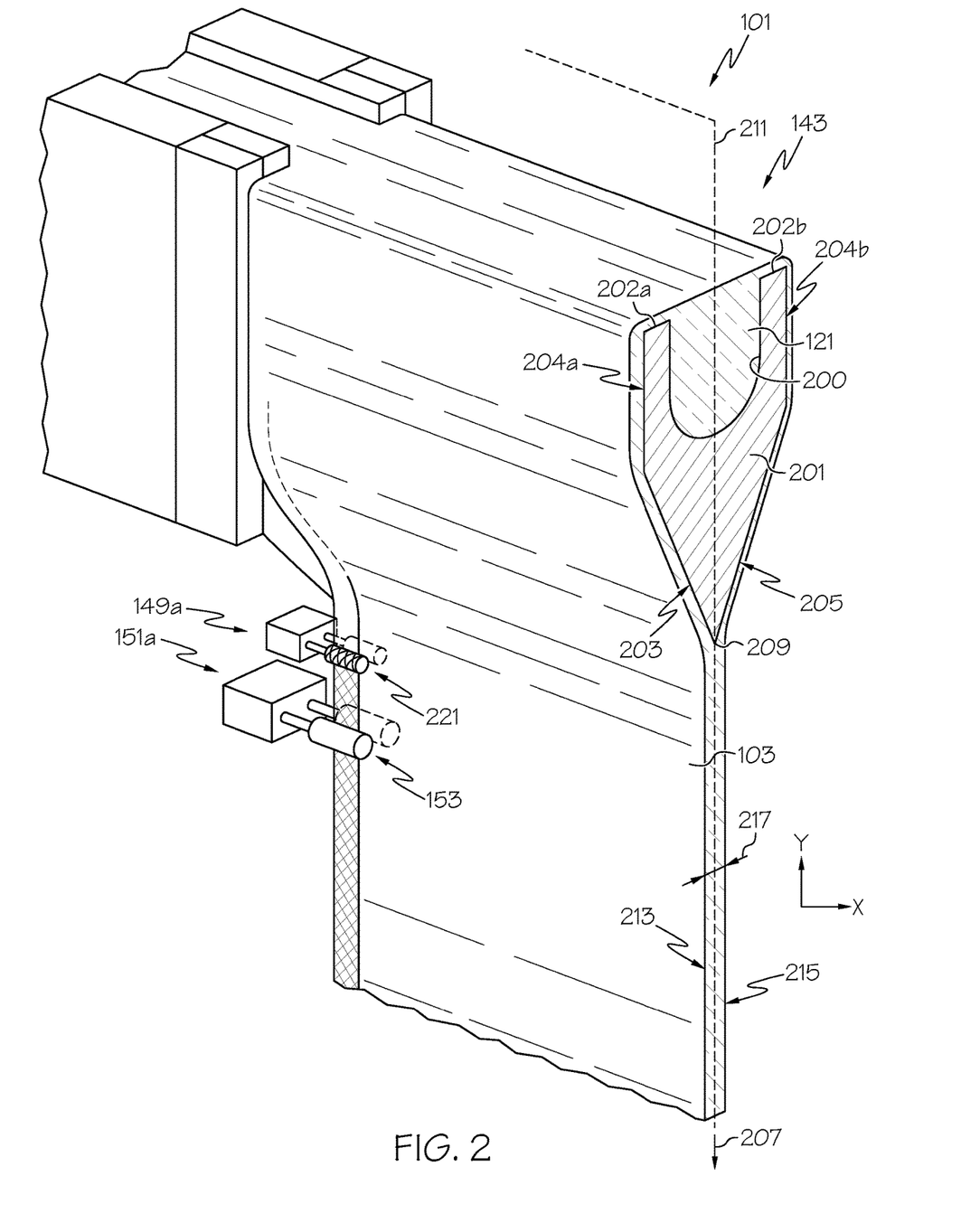
FIG. 2 is a cross-sectional perspective view of the glass manufacturing apparatus along line 2-2 of FIG. 1.

FIG. 2 is a cross-sectional perspective view of the glass manufacturing apparatus 101 along line 2-2 of FIG. 1. As shown, the forming vessel 143 can include a trough 200 configured to receive the molten material 121 from the inlet 141. The forming device 143 further includes a forming wedge 201 comprising a pair of downwardly inclined converging surface portions 203, 205 extending between opposed ends of the forming wedge 201. The pair of downwardly inclined converging surface portions 203, 205 converge along a draw direction 207 to form a root 209. A draw plane 211 extends through the root 209 wherein the glass ribbon 103 may be drawn in the draw direction 207 along the draw plane 211. As shown, the draw plane 211 can bisect the root 209 although the draw plane 211 may extend at other orientations with respect to the root 209.

Referring to FIG. 2, in one example, the molten material 121 can flow from the inlet 141 into the trough 200 of the forming vessel 143. The molten material 121 can then overflow from the trough 200 by simultaneously flowing over corresponding weirs 202a, 202b and downward over the outer surfaces 204a, 204b of the corresponding weirs 202a, 202b. Respective streams of molten material then flow along the downwardly inclined converging surface portions 203, 205 of the forming wedge 201 to be drawn off the root 209 of the forming vessel 143, where the flows converge and fuse into the glass ribbon 103. The glass ribbon 103 may then be drawn off the root 209 in the draw plane 211 along draw direction 207.

As shown in FIG. 2, the glass ribbon 103 may be drawn from the root 209 with a first major surface 213 and a second major surface 215. As shown, the first major surface 213 and the second major surface 215 face opposite directions with a thickness 217 that can be less than or equal to about 1 mm, for example, from about 50 μm to about 750 μm, for example from about 100 μm to about 700 μm, for example from about 200 μm to about 600 μm, for example from about 300 μm to about 500 μm.

In some embodiments, glass manufacturing apparatus 101 for fusion drawing a glass ribbon can also include at least one edge roll assembly 149a, 149b. Each illustrated edge roll assembly 149a, 149b can include a pair of edge rolls 221 configured to provide proper finishing of the corresponding opposed edge portions 223a, 223b of the glass ribbon 103.

In further examples, the glass manufacturing apparatus 101 can further include a first and second pull roll assembly 151a, 151b. Each illustrated pull roll assembly 151a, 151b can include a pair of pull rolls 153 configured to facilitate pulling of the glass ribbon 103 in the draw direction 207 of the draw plane 211.

Figure 3:
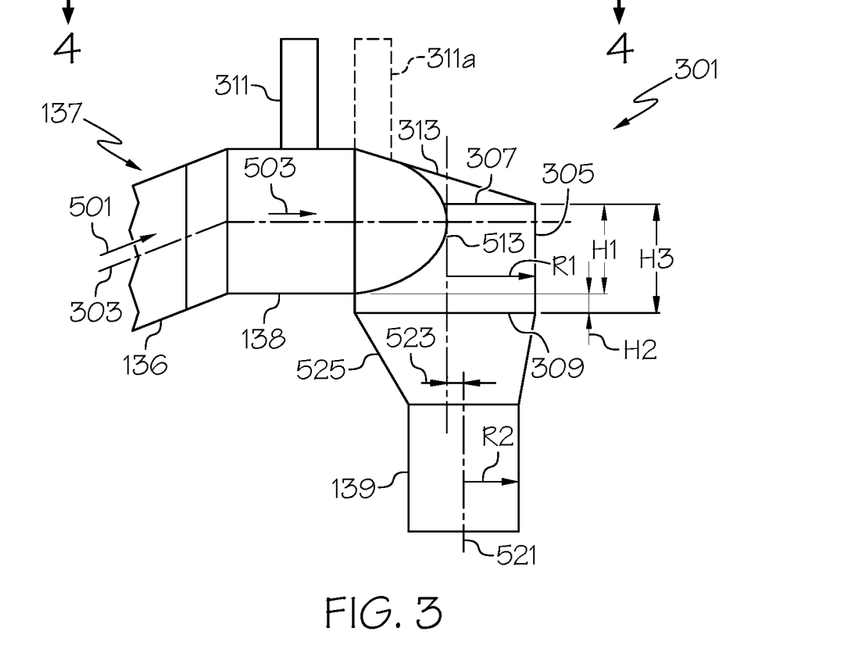
FIG. 3 is a side view of a second embodiment of a delivery vessel.
Figure 4:
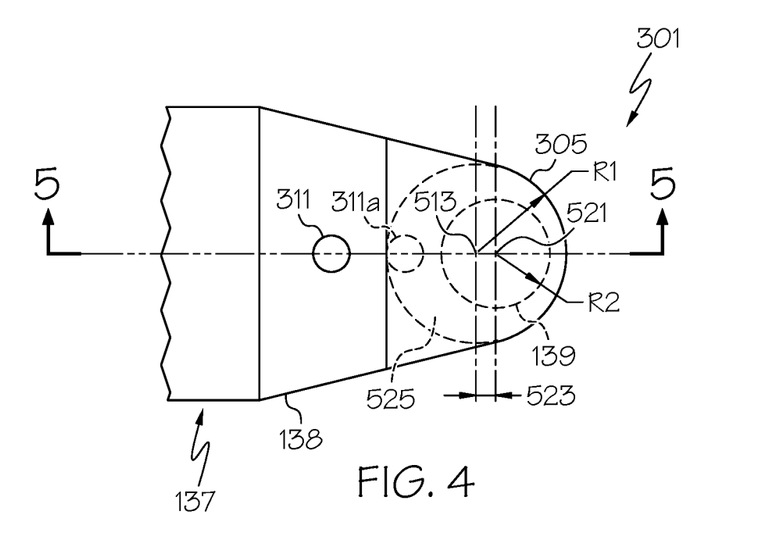
FIG. 4 is a top view of the second embodiment of the delivery vessel along line 4-4 of FIG. 5.
Figure 5:
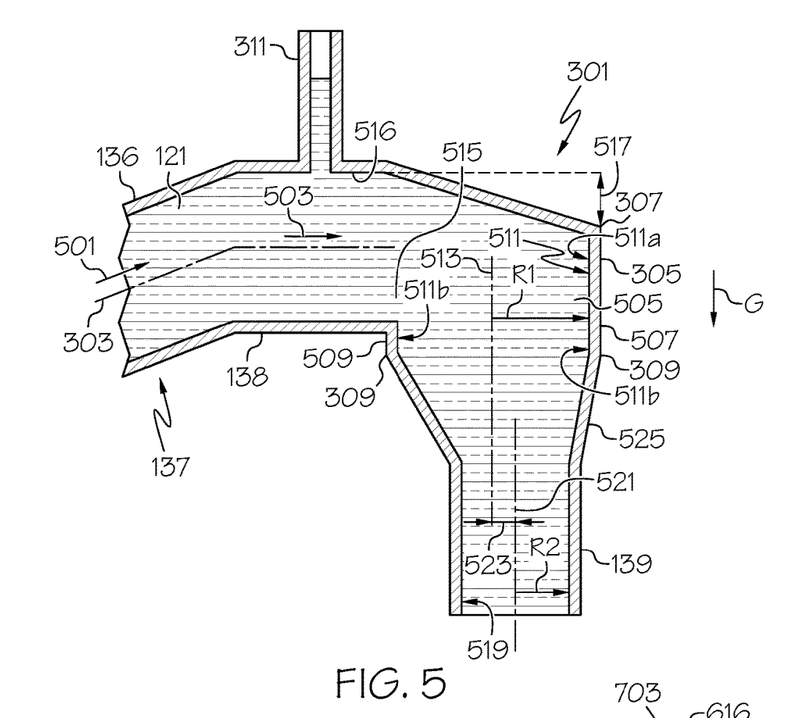
FIG. 5 is a vertical cross-sectional view of the second embodiment of the delivery vessel along line 5-5 of FIG. 4.
Figure 6:
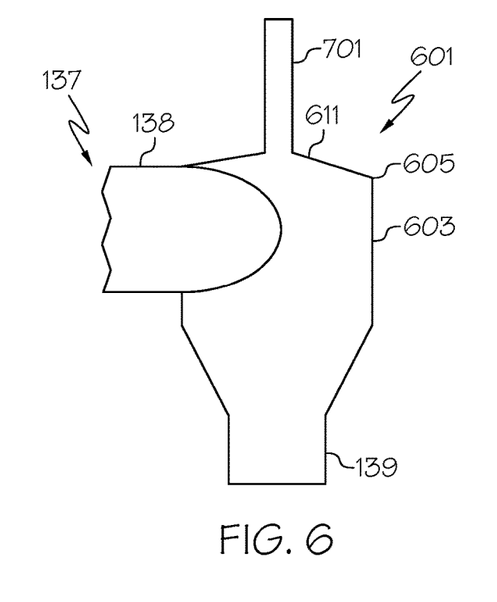
FIG. 6 is a side view of a third embodiment of a delivery vessel.
Figure 7:
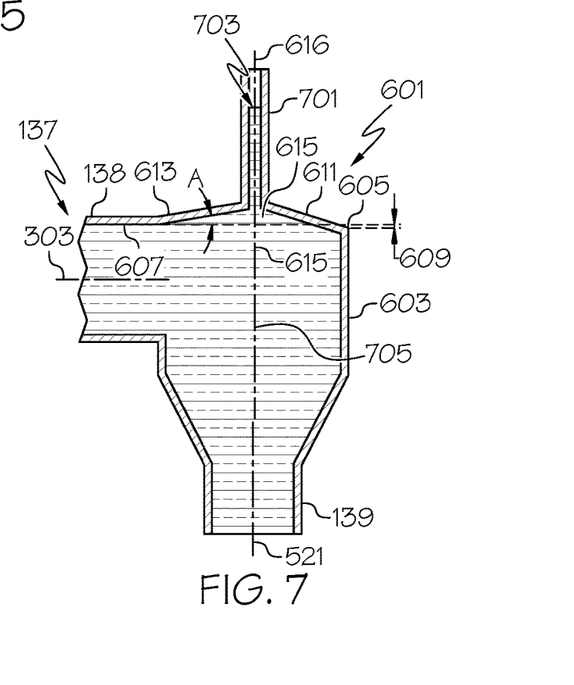
FIG. 7 is vertical cross-sectional view of the third embodiment of the delivery vessel of FIG. 6.
Figure 8:
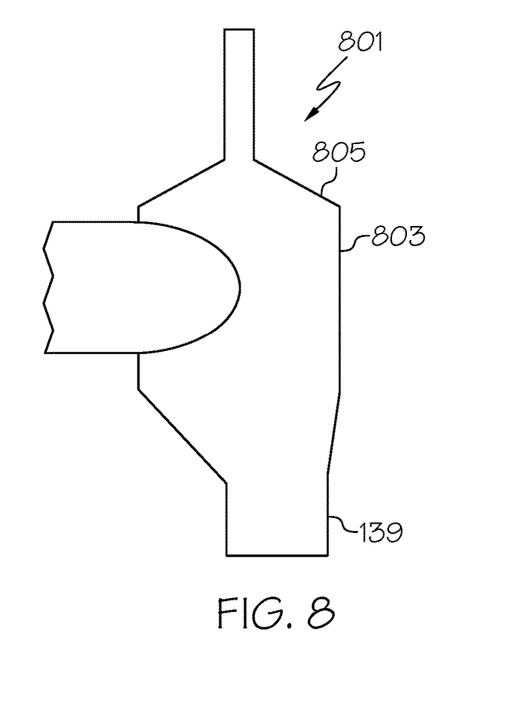
FIG. 8 is a side view of a fourth embodiment of a delivery vessel.
Figure 9:
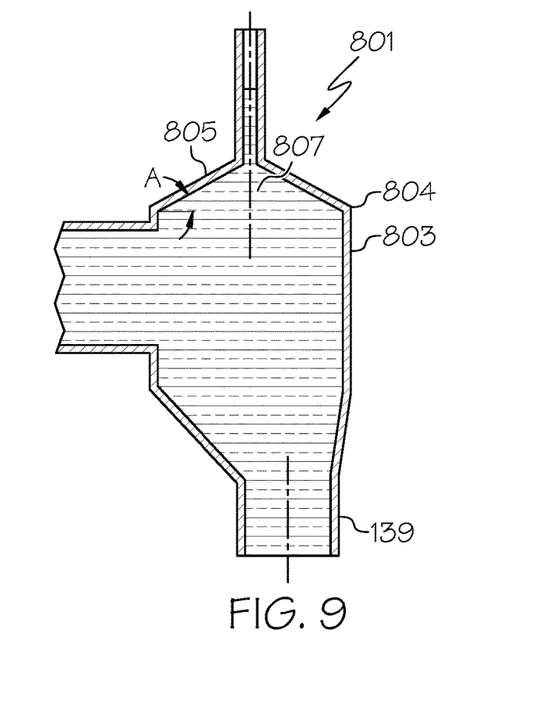
FIG. 9 is vertical cross-sectional view of the fourth embodiment of the delivery vessel of FIG. 8.
Figure 10:
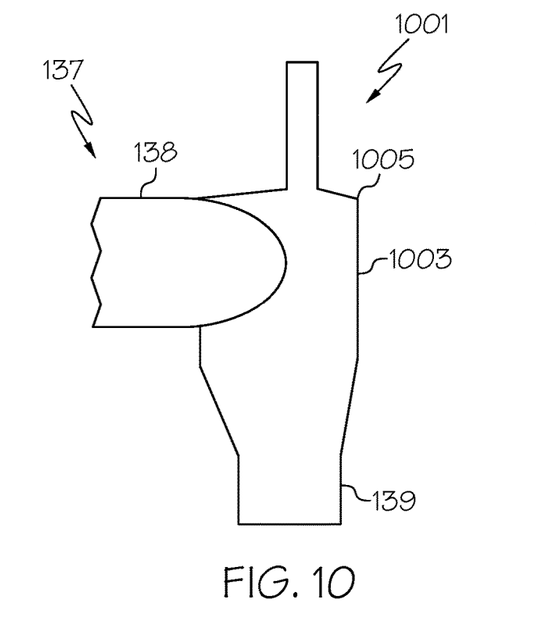
FIG. 10 is a side view of a fifth embodiment of a delivery vessel.
Figure 11:
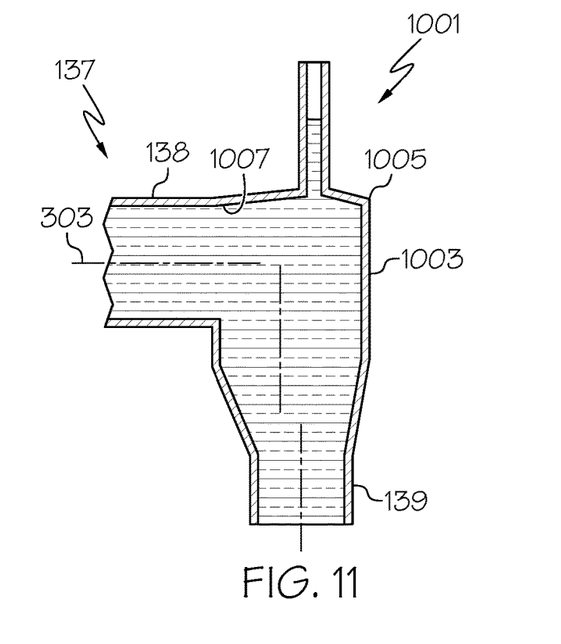
FIG. 11 is vertical cross-sectional view of the fifth embodiment of the delivery vessel of FIG. 10.

Glass manufacturing apparatus 101 of the disclosure may include a delivery vessel that incorporates one or any combination of features of the delivery vessels in accordance with various embodiments of the disclosure. FIG. 1 illustrates the delivery vessel 133 in accordance with a first embodiment of the disclosure. FIGS. 3-5 illustrate a delivery vessel 301 in accordance with a second embodiment of the disclosure. FIGS. 6 and 7 illustrate a delivery vessel 601 in accordance with a third embodiment of the disclosure. FIGS. 8 and 9 illustrate a delivery vessel 801 in accordance with a fourth embodiment of the disclosure. FIGS. 10 and 11 illustrate a delivery vessel 1001 in accordance with a fifth embodiment of the disclosure.

As demonstrated by the embodiments of the delivery vessels 133, 301, 601 and 1001 an elevation of an upper end of a body portion of the delivery vessel may be substantially equal to or lower than an uppermost portion of the travel path in the downstream end 138 of the conduit 137 (e.g., the "third conduit" 137 shown in FIG. 1). By way of example, the delivery vessel 301 of FIGS. 3-5 will be described with the understanding that, unless otherwise distinguished, various features of the other delivery vessels 133, 601 and 1001 may include identical or similar features to those described with respect to the delivery vessel 301.

FIG. 3 illustrates the downstream end 138 of the conduit 137 being connected to the delivery vessel 301. In one example, the conduit 137 can include an intermediate segment 136 that can optionally define an upwardly inclined travel segment of a travel path 303. In operation, as shown in FIG. 5, molten material 121 may travel in direction 501 along the upwardly inclined travel segment to the downstream end 138 of the conduit 137. Molten material 121 may then travel in direction 503 along a horizontal travel segment to an interior 505 of the delivery vessel 301. In one example, the travel direction 503 of the downstream end 138 may be substantially horizontal to travel perpendicular to the direction "G" of gravity although other directions may be provided in further examples. Although the conduit 137 is shown extending from an upstream end 134 connected to an upstream molten material station (e.g., mixing vessel 131) to the downstream end 138 connected to the delivery vessel, in further embodiments, the conduit, if provided, may comprise the downstream end 138 connected to the delivery vessel. For instance, the conduit may comprise a coupling including the downstream end wherein another conduit or upstream molten material station may be connected to the coupling.

Each delivery vessel of the disclosure can include a body portion with a cylindrical inner surface extending along a central axis of the body portion. Various shaped cylindrical inner surfaces may be provided. For instance, the cylindrical inner surface may comprise a circular cylindrical surface where the profile of the cross section along a plurality of planes perpendicular to the central axis is in the shape of a circle. In further examples, the cylindrical inner surface may comprise an elliptical cylindrical surface, parabolic cylindrical surface or other curvilinear cylindrical surface where the profile of the cross section along a plurality of planes perpendicular to the central axis is respectively in the shape of an ellipse, parabola or curvilinear profile. In some embodiments, a circular cylindrical inner surface may simplify fabrication and simply installation of heating coils along the circular cylindrical configuration of the body portion of the delivery vessel.

As shown, the delivery vessels 133, 301, 601, 801 and 1001 each include a corresponding body portion 161, 305, 603, 803 and 1003 with a circular cylindrical inner surface extending along a central axis of the body portion. By way of illustration, features of the circular cylindrical inner surface of the body portion 305 shown in FIGS. 3-5 will be described with the understanding that body portions 161, 603, 803 and 1003 shown in FIGS. 1 and 6-11 can include similar or identical features. As shown in FIG. 3, the body portion 305 of the delivery vessel 301 includes a cylindrical configuration (e.g., a circular cylindrical configuration). As shown in FIG. 5, the body portion 305 can include a front wall 507 and an optional rear wall 509. The body portion 305 includes a circular cylindrical inner surface 511 that can entirely circumscribe a central axis 513 (e.g., the illustrated symmetrical axis 513) of the body portion 305 and/or partially circumscribe the central axis 513 of the body portion 305. For instance, as will be appreciated by the embodiment of FIGS. 3-5, a partial height "H1" of the overall height "H3" of the body portion 305 between the upper end 307 (e.g., uppermost end) and the lower end 309 (e.g., lowermost end) can include a circular cylindrical inner surface 511a that only partially circumscribes the central axis 513 of the body portion 305. Indeed, as shown, a part 515 of the body portion 305 can be laterally open to the downstream end 138 of the conduit 137 to permit at least partial lateral entry of molten material 121 into the interior 505 of the delivery vessel 301. As further shown, another partial height "H2" of the overall height "H3" of the body portion 305 includes a circular cylindrical inner surface 511b that entirely circumscribes the central axis 513 of the body portion 305.

Although not shown, the entire overall height "H3" of the body portion 305 may include a cylindrical inner surface (e.g., circular cylindrical inner surface) that entirely circumscribes the central axis 513 of the body portion 305. In such examples, all or substantially all of the molten material 121 can enter through the open upper end 307 (e.g., uppermost end) of the body portion 305 into the interior of the body portion 305. In further embodiments, although not shown, the entire overall height "H3" of the body portion 305 may include a cylindrical inner surface (e.g., circular cylindrical inner surface) that partially circumscribes the central axis 513 of the body portion 305. In such examples, a substantial portion of the molten material 121 (e.g., substantially all of the molten material 121) may be configured to enter laterally into the interior of the body portion 305.

The inner cylindrical surface may have a cross section along the overall height "H3" including a radius "R1" shown in FIG. 5 and schematically shown in FIGS. 3 and 4. The radius "R1" can be selected based on a variety of factors such as the overall flow rate of molten glass. Providing the wall of the body portion 305 with a cylindrical shape can be beneficial to help accommodate heat elements that are relatively easily installed on objects having a circular outer periphery. While radius "R1" can vary along the height, in the illustrated embodiments body portion 305 can include substantially the same radius "R1" and, consequently, substantially the same diameter (i.e., diameter=2×R1), over the entire overall height "H3" from the upper end 307 of the body portion 305 to the lower end 309 of the body portion 305.

In some embodiments of the disclosure, an elevation of the upper end of the body portion may be substantially equal to or lower than an uppermost portion of the travel path in the downstream end of the conduit. For instance, as shown in FIGS. 1, 3-7, 10 and 11, the elevation of the upper end of each of the body portions 161, 305, 603 and 1003 of the respective delivery vessels 133, 301, 601 and 1001 are substantially equal to or lower than the uppermost portion of the travel path in the downstream end of the conduit. It has been discovered that providing the elevation of the upper end of the body portion that is substantially equal to or lower than a uppermost portion of the travel path in the downstream end of the conduit can help reduce stagnant flow areas, thereby avoiding undesirable glass imperfections that may otherwise occur with the upper end of the body portion being located higher than the uppermost portion of the travel path in the downstream end of the conduit.

As shown in the embodiment of FIGS. 3-5, the elevation of the upper end 307 (e.g., uppermost end 307) of the body portion 305 of the delivery vessel 301 can be lower (e.g., by distance 517) than the elevation of the uppermost portion 516 of the travel path 303 in the downstream end 138. As also shown in the embodiment of FIG. 6-7, the elevation of the upper end 605 (e.g., uppermost end 605) of the body portion 603 of the delivery vessel 601 can be lower (e.g., by distance 609) than the elevation of the uppermost portion 607 of the travel path 303 in the downstream end 138.

FIGS. 1 and 10-11 illustrate embodiments where the elevation of the upper end of the body portion 161, 1003 may be substantially equal to the uppermost portion or the travel path in the downstream end of the conduit. By way of example, the embodiment shown in FIGS. 10 and 11 will be described with the understanding that similar or identical features can be provided in the embodiment shown in FIG. 1. For instance, as shown in FIGS. 10 and 11, the upper end 1005 (e.g., uppermost end 1005) of the body portion 1003 of the delivery vessel 1001 can be substantially equal to the elevation of the uppermost portion 1007 of the travel path 303 in the downstream end 138.

In some embodiments (e.g., see FIGS. 1, and 6-11) the delivery vessel 133, 601, 801, 1001 may include a conical top (e.g., frustoconical, hyperboloidal, or other polygonal top) attached to the upper end of the body portion. For instance, FIGS. 8-9 illustrate the delivery vessel 801 including a conical top 805 that may be attached to the upper end 804 of the body portion 803. The illustrated conical top 805 may be provided with a conical taper with a taper angle "A" that can be relatively large, wherein a relatively large amount of glass melt may accumulate within an area 807 of the conical top 805. In further embodiments, the conical taper angle "A" may be reduced to be within a range from greater than 0° to about 20°. In further embodiments, the taper angle "A" can be reduced to be within a range from greater than 0° to about 15°, such as greater than 0° to about 10°, such as greater than 0° to about 5°, such as from about 5° to about 20°, such as from about 5° to about 15°, such as from about 5° to about 10°, such as from about 10° to about 20°, such as from about 10° to about 15°, such as from about 15° to about 20°. It was discovered that reducing the conical taper can be desired to reduce the area defined by the conical top and consequently reduce potential stagnation areas for glass melt residing within the area defined by the conical top.

Each delivery vessel 133, 601 and 1001 of the embodiments of FIGS. 1, 6, 7, and 10-11 are provided with a conical top having the above referenced taper angle "A" within the above-referenced ranges of from greater than 0° to about 20°. Throughout the disclosure, "conical top" can include a wide range of shapes such as frustoconical, hyperboloidal, or other polygonal top. In some examples, as shown in FIG. 8, the conical top can comprise a circular conical top wherein a plurality of cross sections along planes perpendicular to the central axis of the conical top include a circular cross section. Conical tops can also include other shapes, such as those shown in FIGS. 1, 6, 7, and 10-11 wherein the wall may be tapered at a different angle about the central axis to accommodate different elevations (e.g., of the conduit and/or the body portion). By way of example, features of the conical top 611 of the delivery vessel 601 illustrated in FIGS. 6-7 will be described with the understanding that the conical tops of the delivery vessels 133 and 1001 can include identical or similar features. FIG. 7 illustrates a cross-section of the conical top 611 including a central axis 616 (e.g., the illustrated symmetrical axis 616) of the conical top 611. The conical top 611 includes a conical wall 613 that may be upwardly and inwardly tapered toward the central axis 616 by taper angle "A" within the above-referenced ranges of from greater than 0° to about 20°. The tapered angle is the angle of a cross-sectional profile of the wall with respect to a plane perpendicular to the central axis 616 of the conical top. As the elevation of upper end 605 of the body portion 603 is lower than the uppermost portion 607 of the travel path 303 in the downstream end 138 of the conduit 137, the angle "A" at the left side of the conical wall 613 shown in FIG. 7 will be less than the angle "A" of the right side of the conical wall 613 shown in FIG. 7 while all of the taper angles "A" are within the above-referenced ranges of from greater than 0° to about 20°.

The reduced taper of taper angle "A" provides a reduced area 615 defined by the conical top 611 that reduces the amount of molten material that may accumulate and stagnate within this area. Furthermore, in some embodiments, taper angle "A" may still be sufficient to allow any bubbles to travel upwardly along the inside surface of the conical wall 613 that may be vented by the illustrated optional stand pipe 701 which can be positioned to communicate with the uppermost portion of the conical top 611.

Although optional, each embodiment of the disclosure can include a stand pipe similar or identical to the above-referenced stand pipe 701 shown in FIGS. 6 and 7. As shown, the stand pipe 701 can comprise a relatively small diameter tube where a free surface 703 of the molten material 121 may be provided within the length of the stand pipe 701. The relatively small diameter of the stand pipe can reduce the amount of molten material stagnating within the stand pipe. At the same time, the stand pipe 701 provides the free surface 703 of the molten material exposed to the ambient atmosphere, thereby equalizing a pressure within the delivery vessel. As shown, the stand pipe 701 can be provided at the apex of the conical top 611, wherein bubbles traveling along the inner surface of the conical wall 613 may be fed into the stand pipe 701 for traveling up to the free surface 703 for release to the ambient environment.

The stand pipe, if provided, may be positioned off the conical top while still allowing venting of bubbles and equalizing pressure within the delivery vessel. In one embodiment, as shown in FIGS. 3-5, the stand pipe 311 can be attached to the conduit 137, for instance the downstream end 138 of the conduit. As the downstream end 138 of the conduit may be still located at the highest elevation, bubbles may still effectively travel to the stand pipe 311 for subsequent removal. Furthermore, the stand pipe 311 can be further positioned at a location that will allow equalizing the pressure within the delivery vessel 301. As shown in hidden lines in FIGS. 3 and 4, the stand pipe 311*a* may alternatively be located at an upper end of an angled top 313. Bubbles traveling up through the molten glass within the delivery vessel 301 can travel up the angled top 313 to be received in the stand pipe 311a or the stand pipe 311.

As discussed previously, in some embodiments, the glass manufacturing apparatus 101 can comprise a delivery pipe configured to receive molten material from the delivery vessel. In some embodiments, the delivery pipe can be configured to receive molten material from the delivery vessel and the inlet of the forming vessel can be configured to receive molten material from the delivery pipe. FIGS. 1 and 3-11 illustrate embodiments of the delivery pipe 139 that can be similar or even identical to one another, although different configurations may be provided in further embodiments. Accordingly, description of any of the delivery pipes 139 of any of the embodiments throughout the disclosure may apply to any of the delivery pipes of the other embodiments throughout the disclosure.

As illustrated in FIG. 5, the delivery pipe 139 can include an inner surface 519 symmetrically disposed about a central axis 521. As further illustrated in FIG. 5 and schematically illustrated in FIGS. 3-4, the inner surface 519 can comprise a cylindrical inner surface 519 with a radius "R2" extending along the central axis 521 of the delivery pipe 139.

In some embodiments, the central axis of the delivery pipe may be substantially coincident with the central axis of the delivery vessel. For example, the embodiment of FIGS. 6-7 illustrates that the central axis 521 of the delivery pipe 139 can be substantially coincident with a central axis 705 of the body portion 603 of the delivery vessel 601. As further illustrated in FIG. 7, some embodiments may additionally provide the central axis 521 of the delivery pipe 139 to be substantially coincident with the central axis 616 of the conical top 611.

Embodiments of the disclosure also optionally provide the central axis of the delivery pipe that can be offset a distance from the central axis of the body portion of the delivery vessel. For instance, the embodiments illustrated in FIGS. 1, 3-5, and 8-11 optionally provide the central axis of the delivery pipe being offset a distance from the central axis of the body portion of the delivery vessel. By way of illustration, referring to the embodiment of FIGS. 3-5, the central axis 521 of the delivery pipe 139 can be offset a distance 523 from the central axis 513 of the body portion 305 of the delivery vessel 301. Various optional offset distances 523 may be provided in accordance with aspects of the disclosure. For instance, the offset distance 523 can be from greater than 0% to about 50% of the diameter of the body portion 305 of the delivery vessel 301. In further embodiments, the offset distance 523 can be from greater than 0% to about 40%, such as from greater than 0% to about 30%, such as greater than 0% to about 20%, such as greater than 0% to about 10%, such as from about 10% to about 50%, such as from about 10% to about 40%, such as from about 10% to about 30%, such as from about 10% to about 20%, such as from about 20% to about 50%, such as from about 20% to about 40%, such as from about 20% to about 30%, such as from about 30% to about 50%, such as from about 30% to about 40%, such as from about 40% to about 50% of the diameter of the body portion 305 of the delivery vessel 301. In addition or alternatively, the minimum and maximum offset distances 523 can be expressed as it is related to the radius "R1" of inner cylindrical surface of the body portion and the radius "R2" of the inner cylindrical surface of the delivery pipe. In one embodiment, the maximum offset distance 523 can be a difference between R1 and R2 (i.e., R1−R2). In another example, the minimum offset distance 523 can be half of the difference between R1 and R2, i.e., (R1−R2)/2.

In some embodiments the central axis of the delivery pipe may be offset from the central axis of the body portion of the delivery vessel in a direction away from the downstream end of the conduit. For instance, as shown in FIGS. 3-5, the central axis 521 of the delivery pipe 139 may be offset from the central axis 513 of the body portion 305 of the delivery vessel 301 in a direction away from the downstream end 138 of the conduit 137. In the particular illustrated embodiment, the offset direction can comprise the travel direction 503 of the downstream end 138, although the offset direction may be away from the downstream end of the conduit and at an angle relative to the travel direction 503 of the downstream end 138 in further embodiments.

Although not shown, in some embodiments of the disclosure, the central axis of the delivery pipe may be angled relative to the central axis of the body portion of the delivery vessel. Alternatively, with reference to the embodiment of FIGS. 3-5 (and also shown in the embodiments of FIGS. 1 and 8-11), the central axis 521 of the delivery pipe 139 may be substantially parallel and offset with respect to the central axis 513 of the body portion 305 of the delivery vessel 301.

By way of illustration, as shown in FIGS. 3-5, a tapered transition 525 may be provided to attach the delivery pipe to the body portion of the delivery vessel. The tapered transition may be designed to accommodate differing inner diameters as illustrated, wherein the radius "R1" of the body portion is greater than the radius "R2" of the delivery pipe. The tapering transition can also accommodate any offset between the central axis of the body portion of the delivery vessel and the central axis of the delivery pipe.

The various features of the glass manufacturing apparatus discussed above can be provided alone or in combination and, in some embodiments, can facilitate a streamlined delivery of molten material from the conduit 137 to the inlet 141 of the forming vessel 143. Consequently, stagnant areas of molten glass can be avoided or minimized that may otherwise bleed to cause undesirable cord in the glass article eventually formed from the molten material.

Methods of manufacturing glass with the glass manufacturing apparatus of FIGS. 1-7, 10 and 11 will now be described with particular reference to the embodiment of FIGS. 3-5. The methods can optionally include the step of passing molten material 121 along the travel path 303 through the downstream end 138 of the conduit 137 to the interior of the body portion 305 of the delivery vessel 301. The uppermost portion of the molten material 121 within the body portion 161, 305, 603, 1003 can be at an elevation that is substantially equal to (see 161, 1003) or lower than (see 305, 603) an uppermost portion of the molten material 121 in the downstream end 138 of the conduit 137. Providing the uppermost portion of the molten material within the body portion at an elevation that is substantially equal to or lower than the uppermost portion of the molten material in the downstream end of the conduit can avoid stagnation of portions of the molten material within the interior of the body portion, thereby facilitating in reducing or eliminating undesirable cords in the glass articles eventually formed from the molten material.

Methods of manufacturing glass with the glass manufacturing apparatus of FIGS. 1-5 and 8-11 will now be described with particular reference to the embodiment of FIGS. 3-5. The methods can optionally include the step of passing the molten material 121 to the delivery vessel 301. The molten material 121 can then be passed from the delivery vessel 301 to the delivery pipe 139 including the cylindrical inner surface 519 extending along the central axis 521 of the delivery pipe 139, wherein the central axis 521 of the delivery pipe 139 is offset the distance 523 from the central axis 513 of the body portion 305 of the delivery vessel 301. In one embodiment, the molten material may be passed through the interior of the body portion in a direction along the central axis of the body portion of the delivery vessel. For example, the molten material can be passed in a direction having a directional component in the direction along the central axis of the body portion. The molten material can then be passed from the delivery vessel to the delivery pipe, and then passed through the delivery pipe in a direction of the central axis of the delivery pipe. For example, the molten material can be passed in a direction having a directional component in the direction of the central axis of the delivery pipe. Offsetting the central axis of the delivery pipe from the central axis of the body portion of the delivery vessel can provide a smooth transition of molten material passing through the delivery vessel from the conduit to the delivery pipe. As such, the offset arrangement can avoid stagnation of portions of the molten material within the delivery vessel, thereby facilitating in reducing or eliminating undesirable cord in the glass articles eventually formed from the molten material.

Methods of manufacturing glass with the glass manufacturing apparatus of FIGS. 1, 6, 7, 10 and 11 will now be described with particular reference to the embodiment of FIGS. 6-7. The methods can optionally include the step of flowing molten material into the area 615 defined by the conical top 611 attached to the upper end 605 of the body portion 603, wherein the conical top 611 includes the conical taper angle "A" with any of the above-referenced ranges of from greater than 0° to about 20°. Providing the conical top 611 with the above-referenced taper angle "A" with the above-referenced ranges of from greater than 0° to about 20° can reduce the area 615 defined by the conical top, thereby avoiding stagnation of molten material within the conical top. As such, the above-referenced taper angle "A" can avoid stagnation of portions of the molten material within the area defined by the conical top, thereby facilitating in reducing or eliminating undesirable cords in the glass articles eventually formed from the molten material. At the same time, the above-referenced taper angle "A" can guide gas bubbles to be collected, for example, with a stand pipe to reduce bubbles that may be entrained within the flow of molten material.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Likewise, a "plurality" is intended to denote "more than one."

Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for embodiment, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A glass manufacturing apparatus comprising:
 a conduit including a downstream end connected to a delivery vessel, wherein the conduit is configured to deliver molten material along a travel path to the delivery vessel; and
 the delivery vessel including a body portion including a cylindrical inner surface extending along a central axis of the body portion, wherein an elevation of an upper end of the body portion is substantially equal to or lower than an uppermost portion of the travel path in the downstream end of the conduit, and the delivery vessel further includes a conical top attached to the upper end of the body portion, wherein the conical top includes a conical taper with a taper angle from greater than 0° to about 20°.

2. The glass manufacturing apparatus of claim 1, further comprising a forming vessel including an inlet configured to receive the molten material from the delivery vessel.

3. The glass manufacturing apparatus of claim 2, wherein the forming vessel further includes a trough configured to receive the molten material from the inlet, and a wedge, wherein the forming vessel is configured such that molten material may overflow from the trough and flow down converging surfaces of the wedge to be drawn off a root of the wedge as a glass ribbon.

4. The glass manufacturing apparatus of claim 1, wherein the cylindrical inner surface includes a substantially constant diameter from the upper end of the body portion to a lower end of the body portion.

5. The glass manufacturing apparatus of claim 1, further comprising a stand pipe connected to the conical top, wherein the stand pipe is configured to equalize a pressure within the delivery vessel.

6. The glass manufacturing apparatus of claim 1, further comprising a stand pipe attached to the conduit, wherein the standpipe is configured to equalize a pressure within the delivery vessel.

7. The glass manufacturing apparatus of claim 1, further comprising a delivery pipe configured to receive molten material from the delivery vessel, wherein the delivery pipe includes a cylindrical inner surface extending along a central axis of the delivery pipe, wherein the central axis of the delivery pipe is offset a distance from the central axis of the body portion of the delivery vessel.

8. The glass manufacturing apparatus of claim 7, wherein the offset distance of the central axis of the delivery pipe from the central axis of the body portion of the delivery vessel is from greater than 0% to about 50% of a diameter of the body portion of the delivery vessel.

9. The glass manufacturing apparatus of claim 7, wherein the central axis of the delivery pipe is offset from the central axis of the body portion of the delivery vessel in a direction away from the downstream end of the conduit.

10. The glass manufacturing apparatus of claim 7, wherein the central axis of the delivery pipe is substantially parallel to the central axis of the body portion of the delivery vessel.

11. A method of manufacturing glass with the glass manufacturing apparatus of claim 7, the method comprising the steps of:
passing molten material to the delivery vessel;
passing the molten material through an interior of the body portion in a direction along the central axis of the body portion of the delivery vessel;
passing the molten material from the delivery vessel to the delivery pipe; and passing the molten material through the delivery pipe in a direction of the central axis of the delivery pipe.

12. The method of claim 11, further comprising the step of passing the molten material from the delivery pipe to a forming vessel.

13. The method of claim 12, further comprising the step of drawing the molten material from the forming vessel into a glass ribbon.

14. A method of manufacturing glass with the glass manufacturing apparatus of claim 1, the method comprising the steps of:
passing molten material along the travel path through the downstream end of the conduit to an interior of the body portion of the delivery vessel, wherein the uppermost portion of the molten material within the body portion is at an elevation that is substantially equal to or lower than an uppermost portion of the molten material in the downstream end of the conduit.

15. The method of claim 14, further comprising the steps of:
passing the molten material through the interior of the body portion; and
passing the molten material from the delivery vessel to a forming vessel.

16. The method of claim 15, further comprising the step of drawing the molten material from the forming vessel into a glass ribbon.

17. The method of claim 14, further comprising the step of:
passing the molten material from the delivery vessel to a delivery pipe including a cylindrical inner surface extending along a central axis of the delivery pipe, wherein the central axis of the delivery pipe is offset a distance from the central axis of the body portion of the delivery vessel.

18. The glass manufacturing apparatus of claim 1, wherein the taper angle is from about 5° to about 20°.

19. The glass manufacturing apparatus of claim 18, wherein the taper angle is from about 10° to about 20°.

20. A glass manufacturing apparatus comprising:
a conduit including a downstream end connected to a delivery vessel, wherein the conduit is configured to deliver molten material along a travel path to the delivery vessel; and
the delivery vessel including a body portion including a cylindrical inner surface extending along a central axis of the body portion, wherein the travel path extends in a direction transverse to a direction of the central axis and an elevation of an uppermost end of the body portion including the cylindrical inner surface is lower than an uppermost portion of the travel path in the downstream end of the conduit.

21. The glass manufacturing apparatus of claim 20, wherein the direction of the travel path is substantially perpendicular to the direction of the central axis.

22. The glass manufacturing apparatus of claim 20, wherein a part of the body portion is laterally open to the downstream end of the conduit to permit at least partial lateral entry of molten material into an interior of the delivery vessel from the downstream end of the conduit.

23. The glass manufacturing apparatus of claim 20, further comprising a forming vessel including an inlet configured to receive the molten material from the delivery vessel.

24. The glass manufacturing apparatus of claim 23, wherein the forming vessel further includes a trough configured to receive the molten material from the inlet, and a wedge, wherein the forming vessel is configured such that molten material may overflow from the trough and flow down converging surfaces of the wedge to be drawn off a root of the wedge as a glass ribbon.

25. The glass manufacturing apparatus of claim 20, wherein the cylindrical inner surface includes a substantially constant diameter from the upper end of the body portion to a lower end of the body portion.

26. The glass manufacturing apparatus of claim 20, wherein the delivery vessel further includes a conical top attached to the upper end of the body portion, wherein the conical top includes a conical taper with a taper angle from greater than 0° to about 20°.

27. The glass manufacturing apparatus of claim 26, wherein the taper angle is from about 5° to about 20°.

28. The glass manufacturing apparatus of claim 27, wherein the taper angle is from about 10° to about 20°.

29. The glass manufacturing apparatus of claim 26, further comprising a stand pipe connected to the conical top, wherein the stand pipe is configured to equalize a pressure within the delivery vessel.

30. The glass manufacturing apparatus of claim 20, further comprising a stand pipe attached to the conduit, wherein the standpipe is configured to equalize a pressure within the delivery vessel.

31. The glass manufacturing apparatus of claim 20, further comprising a delivery pipe configured to receive molten material from the delivery vessel, wherein the delivery pipe includes a cylindrical inner surface extending along a central axis of the delivery pipe, wherein the central axis of the delivery pipe is offset a distance from the central axis of the body portion of the delivery vessel.

32. The glass manufacturing apparatus of claim 31, wherein the offset distance of the central axis of the delivery pipe from the central axis of the body portion of the delivery vessel is from greater than 0% to about 50% of a diameter of the body portion of the delivery vessel.

33. The glass manufacturing apparatus of claim 31, wherein the central axis of the delivery pipe is offset from the central axis of the body portion of the delivery vessel in a direction away from the downstream end of the conduit.

34. The glass manufacturing apparatus of claim 31, wherein the central axis of the delivery pipe is substantially parallel to the central axis of the body portion of the delivery vessel.

35. A method of manufacturing glass with the glass manufacturing apparatus of claim 31, the method comprising the steps of:
    passing molten material to the delivery vessel;
    passing the molten material through an interior of the body portion in a direction along the central axis of the body portion of the delivery vessel;
    passing the molten material from the delivery vessel to the delivery pipe; and passing the molten material through the delivery pipe in a direction of the central axis of the delivery pipe.

36. The method of claim 35, further comprising the step of passing the molten material from the delivery pipe to a forming vessel.

37. The method of claim 36, further comprising the step of drawing the molten material from the forming vessel into a glass ribbon.

38. The method of claim 35, further comprising the step of flowing molten material into an area defined by a conical top attached to an upper end of the body portion, wherein the conical top includes a conical taper with a taper angle from greater than 0° to about 20°.

39. A method of manufacturing glass with the glass manufacturing apparatus of claim 20, the method comprising the steps of:
    passing molten material along the direction of the travel path through the downstream end of the conduit to an interior of the body portion of the delivery vessel, wherein the uppermost portion of the molten material within the body portion is at an elevation that is substantially equal to or lower than an uppermost portion of the molten material in the downstream end of the conduit.

40. The method of claim 39, further comprising the steps of:
    passing the molten material through the interior of the body portion; and
    passing the molten material from the delivery vessel to a forming vessel.

41. The method of claim 40, further comprising the step of drawing the molten material from the forming vessel into a glass ribbon.

42. The method of claim 39, further comprising the step of:
    passing the molten material from the delivery vessel to a delivery pipe including a cylindrical inner surface extending along a central axis of the delivery pipe, wherein the central axis of the delivery pipe is offset a distance from the central axis of the body portion of the delivery vessel.

43. The method of claim 39, further comprising the step of flowing molten material into an area defined by a conical top attached to the upper end of the body portion, wherein the conical top includes a conical taper with a taper angle from greater than 0° to about 20°.

* * * * *